United States Patent [19]
Oki et al.

[11] 3,856,577
[45] Dec. 24, 1974

[54] ELECTROCHEMICAL CELL SUPPORT AND CONTACT STRUCTURE

[75] Inventors: Toshihiko Oki, Suwa; Hirohisa Kurita, Shimosuwa; Motoyuki Fujimori, Suwa, all of Japan

[73] Assignee: Kabushiki Kaisha Suwa Seikosha, Tokyo, Japan

[22] Filed: July 21, 1972

[21] Appl. No.: 274,115

[30]     Foreign Application Priority Data
July 22, 1971   Japan.............................. 46-54859

[52] U.S. Cl.................................. 136/171, 136/173
[51] Int. Cl. ........................................... H01m 1/04
[58] Field of Search................... 136/173, 171–172, 136/135, 166; 325/352; 240/10.68, 10.66; 206/1, 1.5; 95/31

[56]           References Cited
           UNITED STATES PATENTS
2,293,354   8/1942   Munchow ........................... 136/171
2,692,944   10/1954  Mendelson...................... 136/173 X
2,988,588   6/1961   Hartwig .............................. 136/135
3,537,909   11/1970  Horton............................... 136/173

*Primary Examiner*—Anthony Skapars
*Attorney, Agent, or Firm*—Blum Moscovitz Friedman & Kaplan

[57]           ABSTRACT

Electrochemical cell support and contact structures suitable for use in cell-powered devices, and particularly in wristwatches, are disclosed in which short circuit in the event of insertion of a cell in an improper orientation is avoided. Structures are also shown which prevent application of voltage with reversed polarity to a cell-powered device.

2 Claims, 12 Drawing Figures

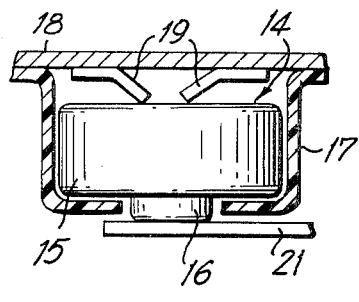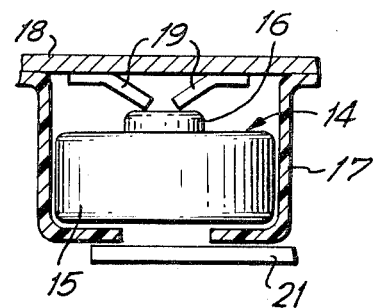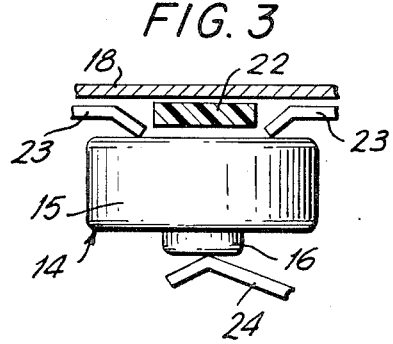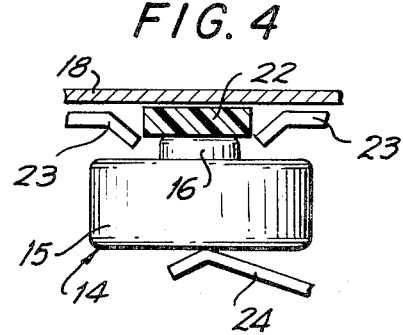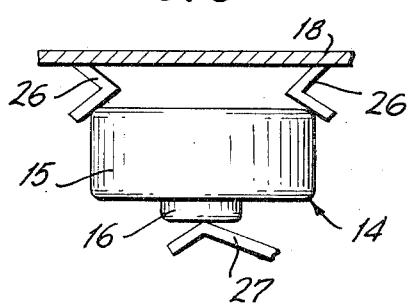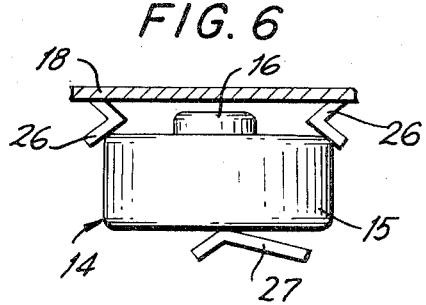

ELECTROCHEMICAL CELL SUPPORT AND CONTACT STRUCTURE

BACKGROUND OF THE INVENTION

The development of miniature cells of relatively high capacity has resulted in the introduction of a wide variety of cell and battery operated devices. Since the devices are to be used by individuals who may well be completely unversed in the use of cells or batteries, it is necessary that provision be made against damage to the cell or battery, and in particularly, that short circuit be avoided, as the result of improper insertion of the electrochemical power source. Essentially the same point holds true with respect to manufacture. In order to hold down costs, it is desirable that devices to be powered by electrochemical cells and which are to be made by mass production techniques be so designed that improper insertion of a cell be made impossible, thereby making it possible to use relatively unskilled labor.

SUMMARY OF THE INVENTION

Support means for an electrochemical cell in a cell-powered device are designed for accepting a cell which is essentially disc or button shaped where the casing of the cell constitutes one terminal. The second terminal of the cell is also button-shaped but is of substantially smaller diameter. The second terminal which is, of course, insulated from the first terminal protrudes a relatively short distance from the center of one face of the cell. A variety of constructions are shown in which insertion of the cell in an improper direction results in failure to make an electrical connection with the contacts leading to the device to be operated by the cell. In another embodiment, insertion of the cell into a recess which serves as a support means or container is prevented by an insulating shoulder which engages the edge of the smaller button constituting the second terminal. In general, the wall which forms the recess or container for holding the cell serves as part of the electrical circuitry leading from one terminal to that part of the device to be powered by the cell.

In most of the embodiments, the constructions are such that not only is short circuiting avoided, but the application of reverse polarity to the device to be operated is also avoided. One embodiment is shown which may be used with devices which cannot be harmed by reverse polarity. In this device, reversal of polarity is not avoided but short circuiting is prevented even if the cell is inserted in improper orientation.

Accordingly, an object of the present invention is to provide an improved container for an electrical cell to be used in powering devices.

Another object of the present invention is to provide an improved container for holding cells intended for powering wristwatches.

A further object of the present invention is to provide an improved container for holding cells intended for powering devices where reversal of polarity as a result of inserting the cell in an improper orientation is avoided.

Still another object of the present invention is to provide an improved container for holding an electrochemical cell intended for powering devices in which the possibility of short circuit as the result of improper insertion of the cell is avoided.

Yet another object of the present invention is to provide an improved container for holding cells to be used in powering devices which makes it possible to use relatively unskilled labor in the assembly of such devices.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a first embodiment of the present invention showing a cell inserted in a container in proper orientation;

FIG. 2 represents the same first embodiment inserted in a container in improper orientation;

FIG. 3 is a second embodiment of the present invention in proper orientation;

FIG. 4 is the same second embodiment in improper orientation;

FIG. 5 is a third embodiment of the present invention in proper orientation;

FIG. 6 is the same third embodiment in improper orientation;

DESCRIPTION OF THE PREFERRED EMBODIMENTS

Figure 7:
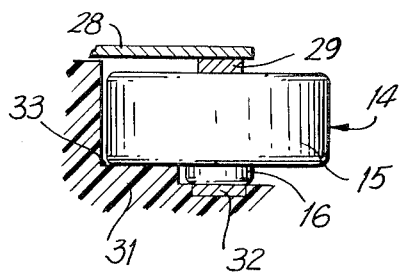
FIG. 7 is a fourth embodiment in proper orientation.

The various container embodiments of the present invention are all designed to hold a disc-shaped cell indicated generally by the reference numeral 14. The cell itself has a disc-shaped portion 15 which is a metallic encasement and which serves as one terminal of the cell. Protruding from one face is a second terminal 16 which is, of course, insulated from the encasement 15. The terminal 16 in general, is also conveniently disc-shaped but is of substantially smaller diameter than the disc-shaped portion 15. In the container embodiment of FIG. 1 walls 17 and 18 are electrically discontinuous. Wall 18 is a conductor and wall 17 is an insulator.

Wall 17 is apertured at the center of its bottom portion to permit second terminal 16 to protrude through the aperture and make contact with spring contact 21. In this orientation, current can be taken to the circuitry of the device through conductive wall 18 and spring contact 21.

In the event that the cell is inserted in improper orientation as is shown in FIG. 2, electrical contact is made with second terminal 16 but no electrical contact is made with terminal 15 because of the fact that wall 17 is an insulator.

In the embodiment shown in FIGS. 1 and 2 both reversal of polarity and prevention of short circuit are provided.

In the embodiment of FIG. 3 a block 22 of insulating material is placed between the spring contacts 23 and below the conductive wall 18. The distance between the spring contacts 23 is greater than the width or diameter of second terminal 16. With the cell 14 inserted into its container in proper orientation spring contacts 23 makes contact with disc-shaped terminal 15 and second terminal 16 makes contact with spring contact 24.

FIG. 4 shows the results of insertion of cell 14 in improper orientation. Block 22 prevents second terminal 16 from making contact with conductive wall 18. Consequently there can be no short circuit and reversal of polarity is also avoided.

The same results can be achieved by using a pair of spring contacts 26 (FIG. 5) which are relatively long and spaced apart widely enough so that they make contact near the periphery of the disc-shaped terminal 15. When inserted in the proper orientation, second terminal 16 makes electrical contact with spring contact 27.

If the cell is inserted in improper orientation as shown in FIG. 6, the length of the spring contacts is great enough so that second terminal 16 cannot make electrical contact with conductive wall 18. Again, both short circuiting and reversal of polarity are avoided.

Figure 8:
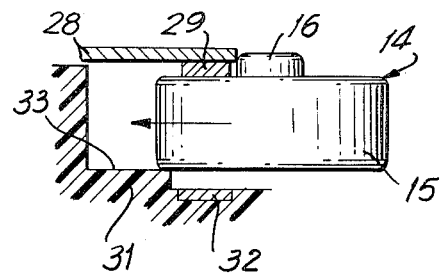
FIG. 8 is the same fourth embodiment in combination with the container into which it cannot be inserted in improper orientation.

In the embodiment of FIGS. 7 and 8, wall 28 holding contact 29 is conductive and preferably flexible in order to ensure good contact between contact 29 and disc-shaped terminal 15. Insulating portion 31 of the container embodiment holds contact 16 in a recess. Contacts 28 and 32 carry current from the cell 14 to the circuitry to be powered.

When an attempt is made to insert cell 14 in improper orientation, bottom surface 33 holds cell 14 high enough so that second terminal 16 engages the outer end of wall 28 and prevents the insertion of cell 14 into the container. Moreover, cell 14 is held away from contact 32 by recess bottom 33 so that neither short circuiting nor reversal of polarity can occur.

Figure 9:
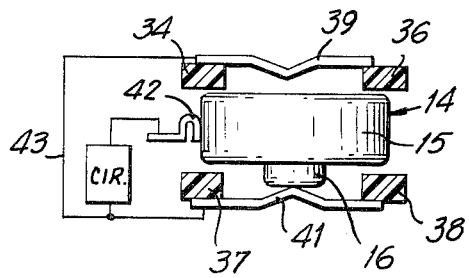
FIGS. 9 and 10 show a fifth embodiment in which a cell can be inserted in either of two directions and yet function properly.
Figure 10:
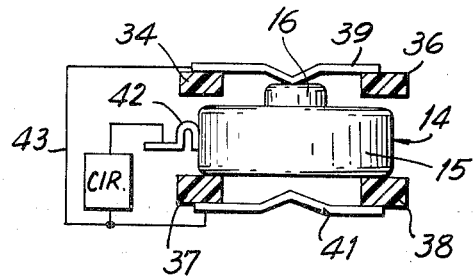

In the embodiment of FIGS. 9 and 10, cell 14 can be inserted in either of two pre-selected directions without giving rise either to a short circuit or to reversal of polarity. In this embodiment, walls 34, 36, 37 and 38 are of insulating material. Spring contact 39 is mounted on walls 34 and 36 and spring contact 41 is mounted on walls 37 and 38. In the arrangement shown in FIG. 9, cell 14 has been inserted in the container with the second terminal 16 in the downward position making contact with spring contact 41. In the orientation shown in FIG. 10 second terminal 16 makes electrical contact with spring contact 39. However, spring contacts 39 and 41 are connected externally through electrical connection 43. Connection to the disc-shaped terminal 15 is made by spring contact 42 at the edge or cylindrical face of cell 14. As is evident, the embodiment of FIGS. 9 and 10 permits insertion of cell 14 in either of two orientations without reversal of polarity and without permitting short circuit.

Figure 11:
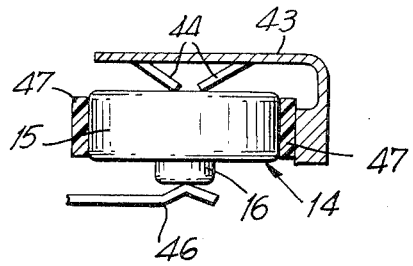
FIG. 11 is a sixth embodiment showing a cell inserted in proper orientation.
Figure 12:
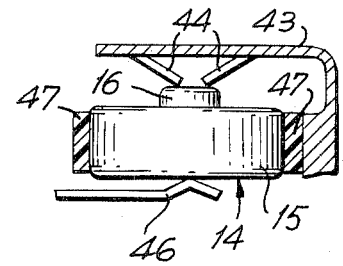
FIG. 12 is the same fifth embodiment in improper orientation.

In certain applications reversal of polarity can be tolerated but short circuit, of course, cannot. In the embodiment of FIGS. 11 and 12, wall 43 is conductive. The desired orientation is that shown in FIG. 11 where the disc-shaped terminal makes contact with conductors 44 which, in turn, are electrically continuous with wall 43. Second terminal 16 makes contact with spring contact 46. Surrounding the periphery of the cell is a jacket 47 of insulating material. In the preferred orientation of FIG. 11, the jacket 47 performs no function. However, in the event that the cell is inserted into the container oriented as shown in FIG. 12, insulating jacket 47 prevents electrical contact between the disc-shaped terminal and conductive wall 43 thus preventing a short circuit from occurring.

It should be noted that in the description of the embodiment of FIGS. 11 and 12 it has been assumed that the orientation shown in FIG. 11 is the preferred embodiment with respect to polarity. Actually, the polarity of FIG. 12 might, in some cases, be preferred. Nevertheless, the presence of the insulating jacket around the cell prevents short circuit regardless of the preferred polarity.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a cell-powered device wherein a cell must be held in a single specific electric orientation for proper operation of said device, and one of said cell terminals is a casing having a longitudinal axis and the other of said cell terminals projects from said casing in a direction along said axis and is substantially smaller in diameter than said one terminal and short circuiting between said terminals must be avoided, the improvement comprising support means for said cell, first and second contact means mounted in juxtaposition to said support means, said support means and contact means being constructed and arranged to allow serial electrical engagement between said terminals of said cell and said contact means only when said cell is mounted in said support means in a pre-selected orientation, said support means including an insulator means so positioned as to engage said other terminal and prevent electrical connection between said first contact means and said other terminal in the event that said cell is inserted into said support means in other than the pre-selected direction.

2. In a cell-powered device including support means for said cell, said cell having an axis and a periphery parallel to said axis said device further having first and second contact means, and wherein a short-circuit between terminals must be avoided in the event of insertion of said cell into said support means in other than a pre-selected direction, and wherein said cell normally makes mechanical contact at its axial periphery with a wall of said support means, said axial periphery being electrically connected to the first terminal of said cell and said wall being electrically connected to said first contact means, the improvement comprising an insulating jacket around the axial periphery of said cell, said jacket being so positioned as to prevent electrical contact between said wall and said axial periphery.

* * * * *